United States Patent
Sahi et al.

(10) Patent No.: US 9,975,580 B1
(45) Date of Patent: May 22, 2018

(54) JOINT ASSEMBLY FOR VEHICLE BODY

(71) Applicant: Ford Global Technologies, LLC, Dearborn, MI (US)

(72) Inventors: Jaspinder S. Sahi, Novi, MI (US);
Todd John Mueller, Canton, MI (US);
Ye Angela Chen, Northville, MI (US);
Di Wu, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/484,639

(22) Filed: Apr. 11, 2017

(51) Int. Cl.
| | |
|---|---|
| *B62D 27/02* | (2006.01) |
| *B62D 25/06* | (2006.01) |
| *B62D 25/04* | (2006.01) |
| *B60J 7/00* | (2006.01) |

(52) U.S. Cl.
CPC ............. *B62D 27/02* (2013.01); *B62D 25/04* (2013.01); *B62D 25/06* (2013.01); *B60J 7/00* (2013.01)

(58) Field of Classification Search
CPC .. B60J 7/022; B60J 7/02; B62D 27/02; B62D 27/023
USPC ........................................ 296/203.03, 216.01
See application file for complete search history.

(56) References Cited

U.S. PATENT DOCUMENTS

| | | | |
|---|---|---|---|
| 1,805,461 A | 5/1931 | Kubler | |
| 3,078,122 A * | 2/1963 | Werner | ..................... B60J 7/022 296/216.01 |
| 6,877,796 B2 * | 4/2005 | Kimura | .................. B60J 5/0479 296/146.6 |
| 8,177,290 B2 | 5/2012 | Kamimae | |
| 8,651,566 B2 * | 2/2014 | Nakaaki | ................. B62D 25/06 296/203.03 |
| 8,678,484 B2 | 3/2014 | Shono | |
| 9,045,168 B2 * | 6/2015 | Wagner | .................. B62D 25/06 |
| 9,061,644 B2 | 6/2015 | Scott | |
| 9,180,917 B1 * | 11/2015 | Wu | ....................... B62D 27/023 |
| 9,505,447 B2 * | 11/2016 | May | ...................... B62D 27/023 |

* cited by examiner

*Primary Examiner* — Pinel E Romain
(74) *Attorney, Agent, or Firm* — Jason C. Rogers; Brooks Kushman P.C.

(57) ABSTRACT

A vehicle body assembly may include a header, a roof rail, and a gusset component. The header may define a lateral axis extending across a vehicle body. The roof rail may define a longitudinal axis extending fore/aft along the vehicle body. The gusset component is for securing the header and roof rail to one another and includes an edge extending diagonally between the header and the roof rail to reinforce a vehicle body corner joint. The edge may extend diagonally from the header to the roof rail at an angle between thirty and sixty degrees relative to the lateral axis and the longitudinal axis. The edge may define an edge axis oriented at substantially forty-five degrees relative to the lateral axis.

14 Claims, 6 Drawing Sheets

JOINT ASSEMBLY FOR VEHICLE BODY

TECHNICAL FIELD

This disclosure relates to assemblies for vehicle bodies including a gusset component.

BACKGROUND

Torsional stiffness of a vehicle body is an attribute reviewed for various areas of vehicle performance. For example, the torsion stiffness may contribute to ride and handling of the vehicle. In order to improve ride and handling performance, torsional stiffness targets for newer models may be higher than older vehicle body models. Additionally, vehicle bodies including moon roofs provide challenges from a torsional stiffness perspective due to less support structure at a vehicle body roof.

SUMMARY

A vehicle body assembly includes a header, a roof rail, and a gusset component. The header defines a lateral axis extending across a vehicle body. The roof rail defines a longitudinal axis extending fore/aft along the vehicle body. The gusset component is for securing the header and roof rail to one another and includes an edge extending diagonally between the header and the roof rail to reinforce a vehicle body corner joint. The edge may extend diagonally from the header to the roof rail at an angle between thirty and sixty degrees relative to the lateral axis and the longitudinal axis. The edge may define an edge axis oriented at substantially forty-five degrees relative to the lateral axis. The gusset component may further include a gusset flange extending from a body of the gusset component and defining a first plane parallel with a second plane defined by an upper surface of the roof rail. The gusset component may be located adjacent a ventilation opening defined by a roof assembly. The header may include an upper component and a lower component and the gusset component may be formed integrally with one of the upper component and the lower component.

A vehicle body assembly includes a vehicle body, a first roof rail, and a header. The vehicle body includes a vehicle A-pillar. The first roof rail extends fore/aft along the vehicle body for securing to the vehicle A-pillar. The header extends laterally along the vehicle body and includes a gusset component for securing to the vehicle A-pillar and the first roof rail. The gusset component includes an edge oriented substantially forty-five degrees relative to an axis defined by the first roof rail. The vehicle body assembly may further include a second roof rail opposite the first roof rail. The roof rails and the header may define a moon roof opening therebetween. The gusset component may be located adjacent a corner of the moon roof opening. The gusset component may further include a gusset flange offset from a body of the gusset component and defining a first plane parallel with a second plane defined by an upper surface of the first roof rail. The gusset component may further include a gusset flange extending from a body of the gusset component at an angle between 40 degrees and 50 degrees. The header may include an upper header component secured to a lower header component. The gusset component may be attached to a portion of a roof assembly located adjacent a ventilation opening.

A vehicle body corner joint assembly includes an A-pillar, a front header, a roof rail, and a joint assembly. The joint assembly is for securing the A-pillar, the front header, and the roof rail to one another. The joint assembly includes a gusset component having a gusset edge extending between the front header and the roof rail at an angle between thirty and sixty degrees to structurally reinforce the joint assembly. The gusset edge may extend between the front header and the roof rail at substantially forty-five degrees. The gusset component may be formed integrally with one of the A-pillar, the roof rail, and the front header. The gusset component may further include a gusset flange extending from a body of the gusset component and defining a first plane parallel with a second plane defined by an upper surface of the roof rail. The gusset component may be located adjacent a corner of an opening for a moon roof defined by the front header and the roof rail.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
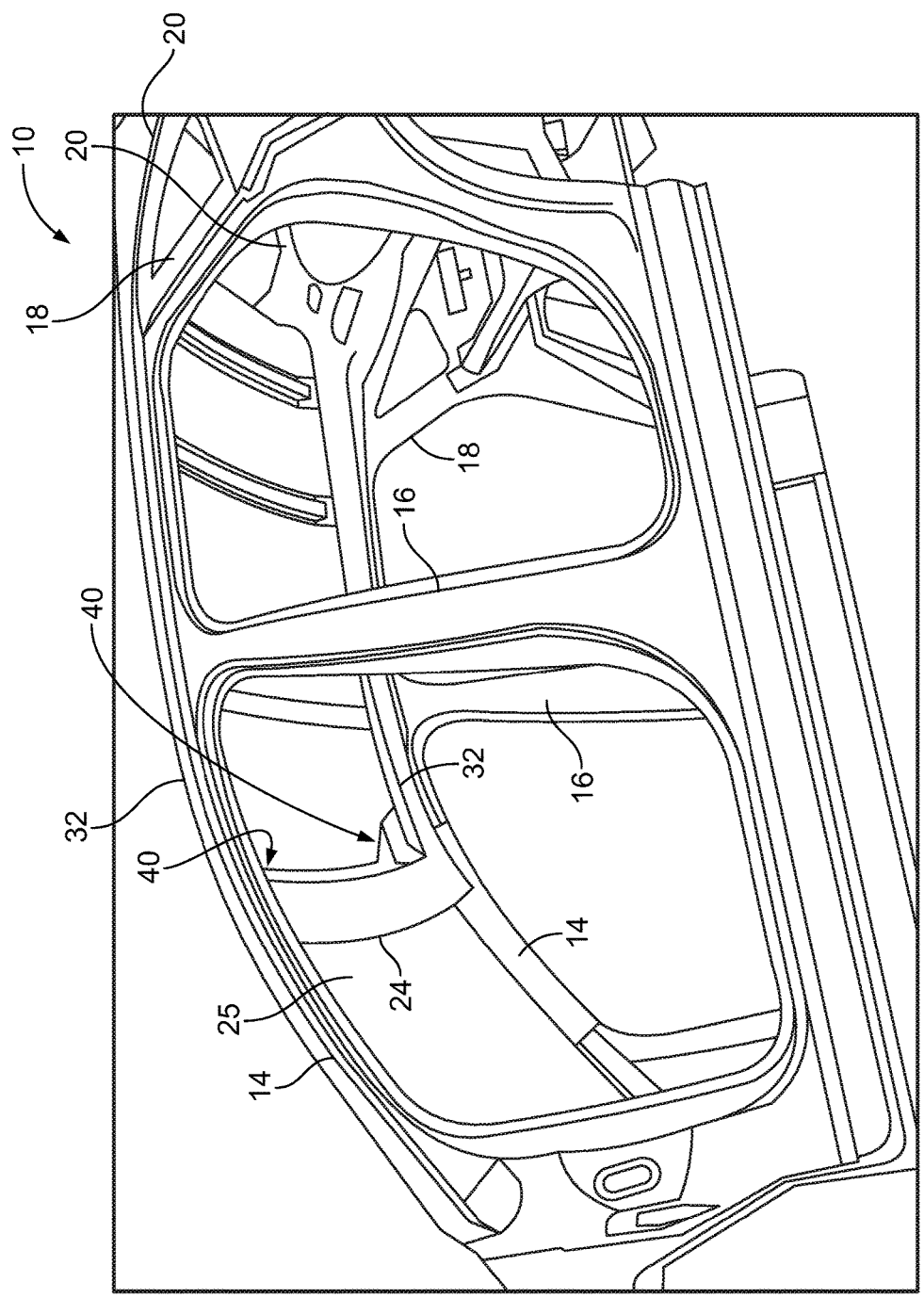
FIG. 1 is a fragmentary perspective view of a portion of an example of a vehicle body.
Figure 2:
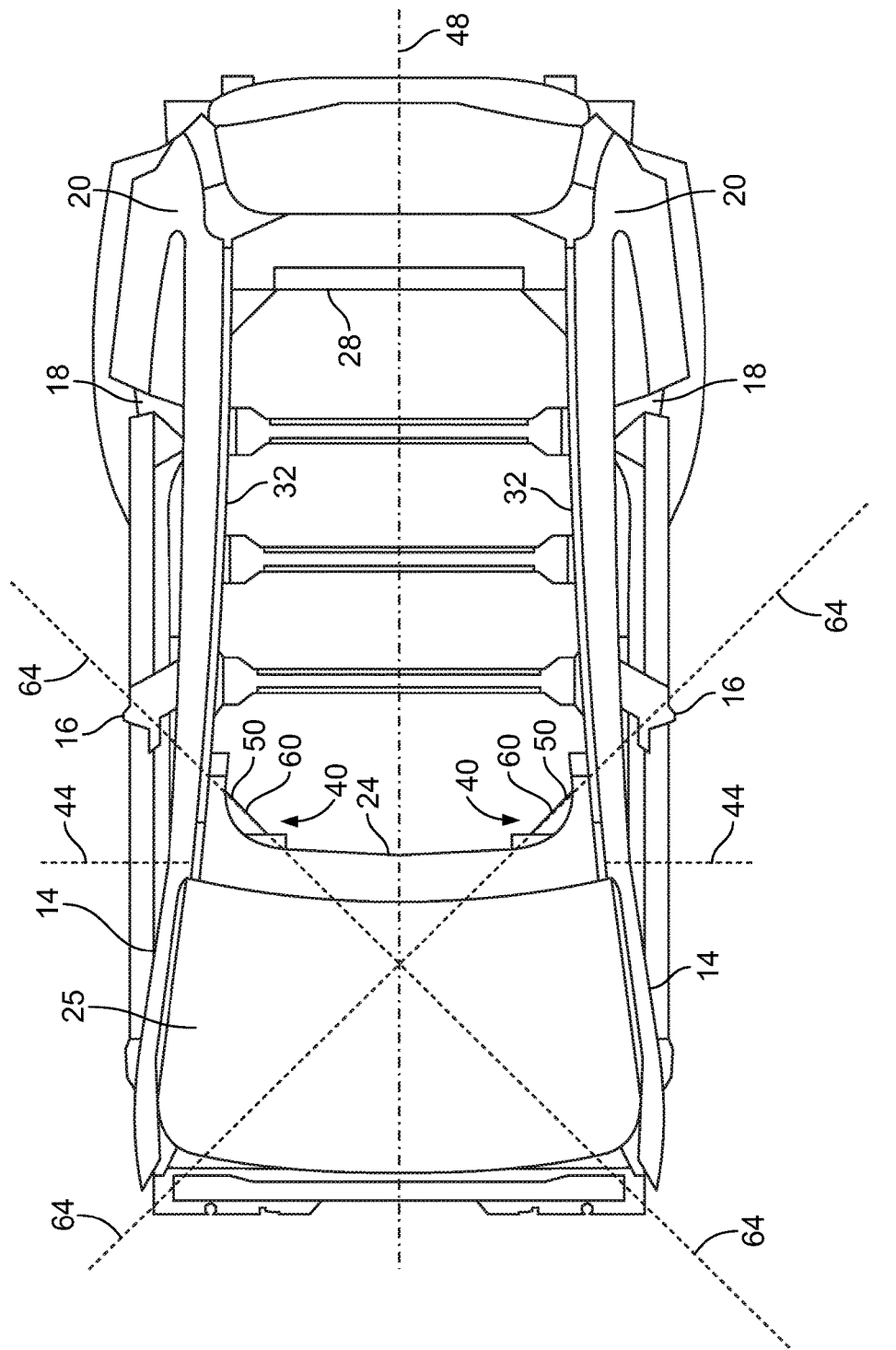
FIG. 2 is a fragmentary top view of the portion of the vehicle body of FIG. 1.

FIGS. 1 and 2 illustrate an example of a portion of a vehicle body, referred to generally as a vehicle body 10 herein. The vehicle body 10 includes an A-pillar 14, a B-pillar 16, a C-pillar 18, and a D-pillar 20. A front header 24 extends between the A-pillars 14. The front header 24 may be a single component or may include an upper header component and a lower header component secured to one another. A front windshield 25 is mounted to the A-pillars 14 and the front header 24. A rear header 28 extends between the D-pillars 20. The D-pillars 20 and the rear header 28 are arranged with one another for mounting a rear windshield (not shown) thereto. Each of a pair of roof rails 32 may be secured to respective vehicle pillars. Each of the pair of roof rails 32 may longitudinally extend fore and aft along the vehicle body 10. The front header 24, the A-pillars 14, and the roof rails 32 may be respectively secured to one another at joint assemblies 40.

The front header 24 defines a first lateral axis 44. The first lateral axis 44 extends laterally across the vehicle body 10. The vehicle body 10 defines a longitudinal central axis 48. The first lateral axis is oriented perpendicular to the longitudinal central axis 48.

The joint assemblies 40 are located at portions of the vehicle body 10 in which torsional stiffness plays a role in a structural rigidity of the vehicle body 10. Increasing a rigidity of roof corner joint assemblies, such as at the joint assemblies 40, assists in increasing torsional stiffness of the vehicle body 10. A gusset component may be used within each of the joint assemblies 40 to assist in transferring loads through the front header 24. The gusset components may also assist in reducing bending and buckling of the roof rails 32 during crash events.

For example, each of the joint assemblies 40 includes a gusset component 50. Each of the gusset components 50 may be a separate component or may be integrated with one of the A-pillar 14, the front header 24, and one of the roof rails 32. Each of the gusset components 50 may be integrated with the upper component of the front header 24 or the lower component of the front header 24. Each of the gusset components 50 includes a front gusset edge 60. The front gusset edge 60 defines a front gusset axis 64. The front gusset axis 64 extends at an angle between thirty and sixty degrees relative to the first lateral axis 44 or the longitudinal central axis 48. For example, the front gusset axis 64 may extend substantially 45 degrees relative to the first lateral axis 44 or the longitudinal central axis 48.

Figure 3:
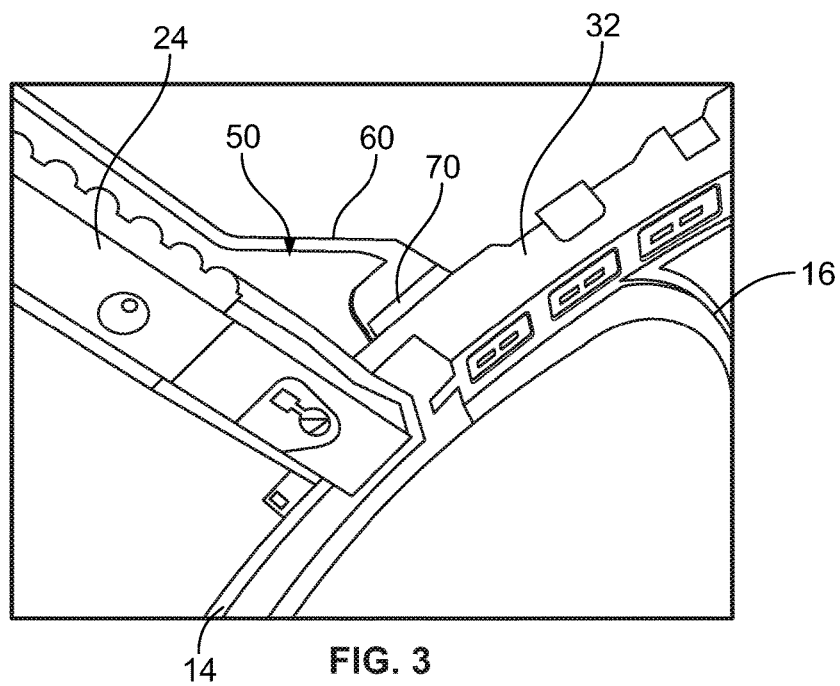
FIG. 3 is a lower fragmentary perspective view of a joint assembly portion of the example of the vehicle body of FIG. 1 showing an example of a gusset component.
Figure 4:
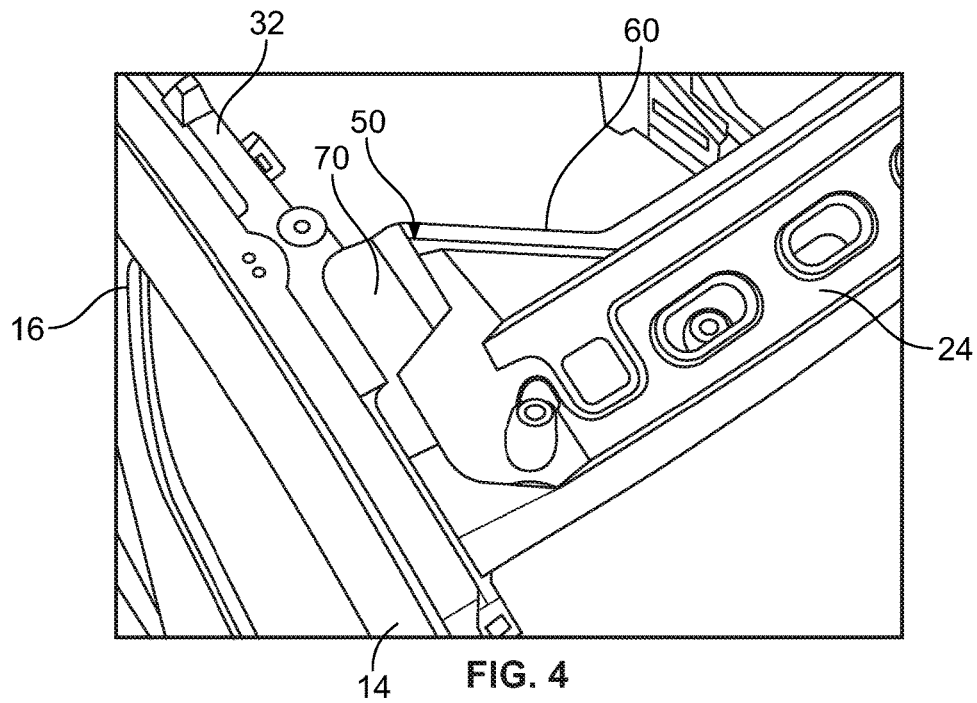
FIG. 4 is an upper fragmentary perspective view of the joint assembly portion of the example of the vehicle body of FIG. 1 showing the example of the gusset component of FIG. 3.

FIGS. 3 and 4 illustrate an example in which the front header 24 and the gusset component 50 are formed integrally with one another. In this example, the gusset component 50 extends toward the roof rail 32 and may be used in a vehicle embodiment including a bottom-load moon roof or a steel roof. A gusset flange 70 is offset from a body of the gusset component 50. The gusset flange 70 defines a plane substantially parallel with a plane defined by an upper surface of the roof rail 32. The front header 24 and the gusset flange 70 may be secured to the roof rail 32 at a location adjacent the A-pillar 16 by, for example, welding and mechanical fasteners such as rivets, to assist in reinforcing the respective corner joint of the vehicle body 10. A structural adhesive may also be used to facilitate securing the components to one another.

Figure 5:
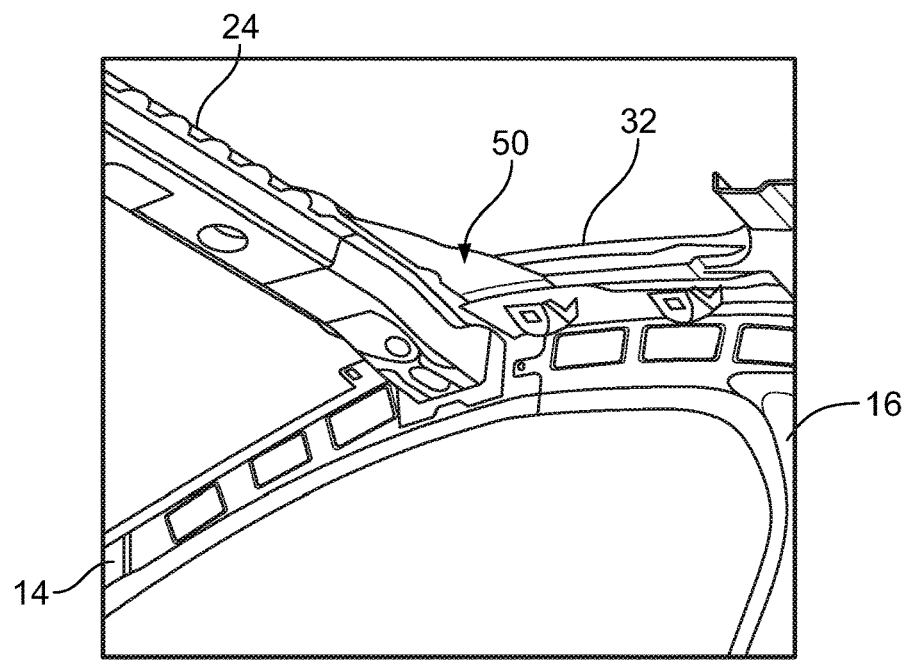
FIG. 5 is a lower fragmentary perspective view of the joint assembly portion of the example of the vehicle body of FIG. 1 showing another example of a gusset component.
Figure 6:
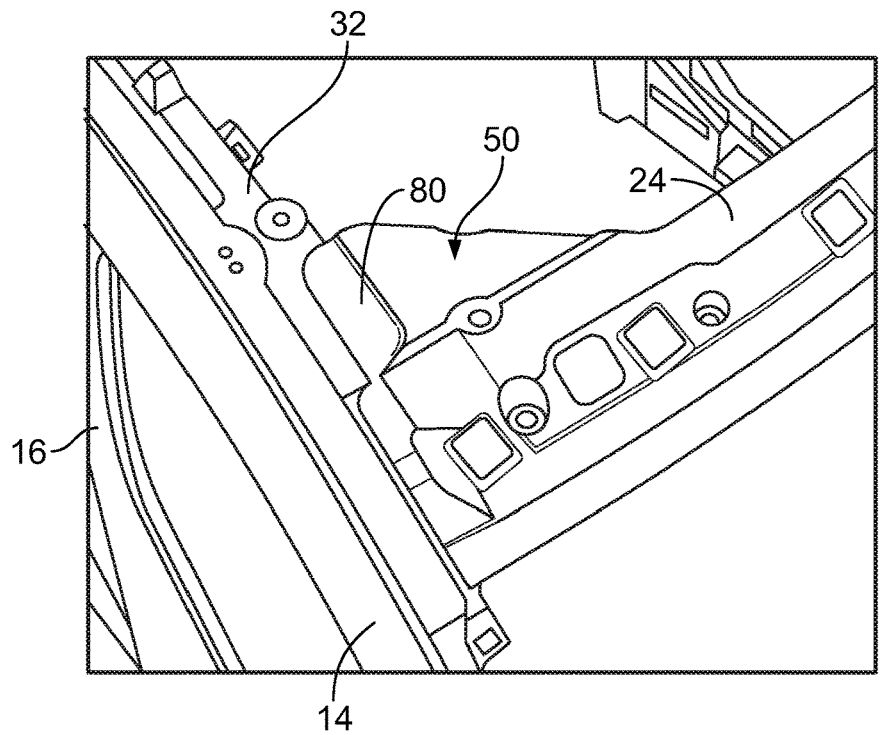
FIG. 6 is an upper fragmentary perspective view of the joint assembly portion of the example of the vehicle body of FIG. 1 showing the example of the gusset component of FIG. 5.

FIGS. 5 and 6 illustrate another example in which the front header 24 and the gusset component 50 are formed integrally with one another. In this example, the gusset component 50 includes a gusset flange 80 instead of the gusset flange 70 and may be used in a vehicle embodiment including a top-load moon roof. The gusset flange 80 may extend from the body portion of the gusset component 50 at an angle between 40 degrees and 50 degrees or at an angle based on the size of components adjacent the gusset flange 80.

Figure 7:
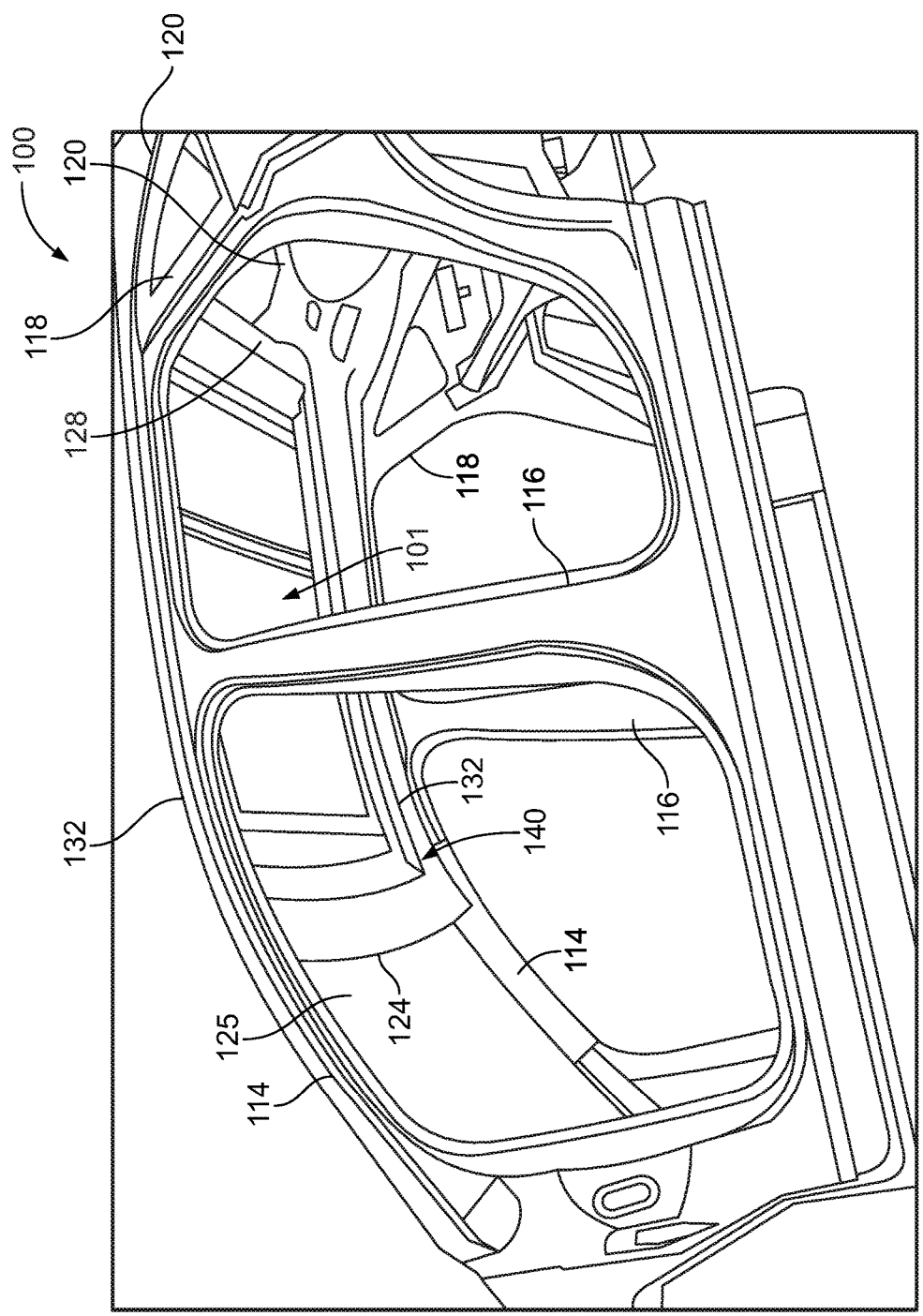
FIG. 7 is a fragmentary perspective view of an example of a portion of a vehicle body.

FIG. 7 illustrates another example of a vehicle body, referred to generally as a vehicle body 100 herein. The vehicle body 100 includes a roof assembly 101, an A-pillar 114, a B-pillar 116, a C-pillar 118, and a D-pillar 120. A front header 124 extends between the A-pillars 114. The front header 124 may be a single component or may include an upper header component and a lower header component. A front windshield 125 is mounted to the A-pillars 114 and the front header 124. A rear header 128 extends between the D-pillars 120. The D-pillars 120 and the rear header 128 are arranged with one another for mounting a rear windshield (not shown) thereto. Each of a pair of roof rails 132 may be secured to respective vehicle pillars. Each of the pair of roof rails 132 may extend fore and aft along the vehicle body 110. The front header 124, the A-pillars 114, and the roof rails 132 may be respectively secured to one another at joint assemblies, such as a joint assembly 140.

Figure 8:
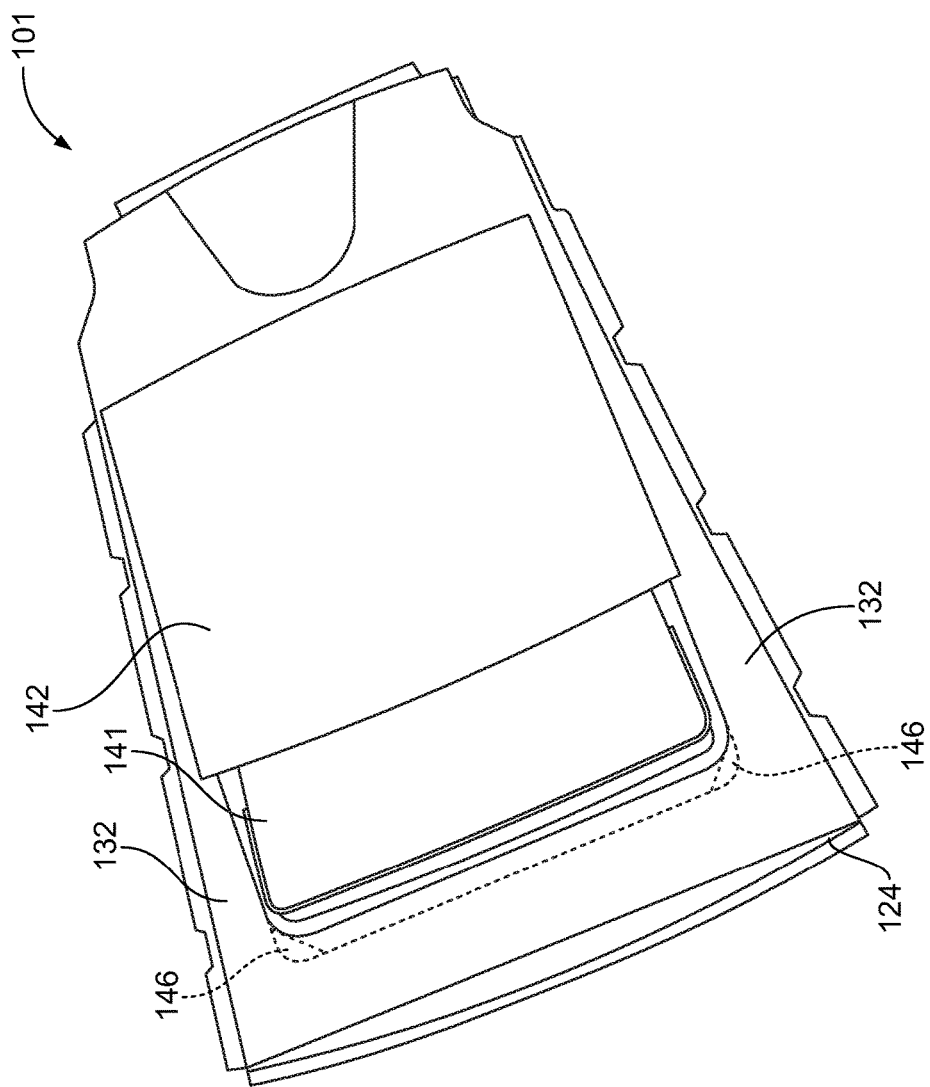
FIG. 8 is a fragmentary perspective view of a moon roof assembly of the vehicle body of FIG. 7.

FIG. 8 illustrates an example of a portion of the roof assembly 101. Opposing roof rails 132 may be spaced from one another and secured to the front header 124. The roof rails 132 and the front header 124 may be arranged with one another to define a ventilation opening such as a moon roof opening 141. Vehicle moon roofs may reduce vehicle body torsional stiffness in comparison to vehicle bodies without moon roofs. A moon roof 142 may be mounted to the roof assembly 101 to translate between at least an open position and a closed position. In this example, a pair of gusset components 146 are formed integrally with the front header 124. Each of the gusset components 146 may be attached to a portion of a moon roof assembly 148. Each of the gusset components 146 may be shaped to accommodate one or more portions of an assembly to support the roof assembly 101. The roof rails 132 and the front header 124 are arranged with one another so that each of the gusset components 146 are located at one of two corners between the roof rails 132 and the front header 124 and adjacent the moon roof opening 141.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle body assembly comprising:
a header defining a lateral axis extending across a body and including an upper and lower component;
a roof rail defining a longitudinal axis extending fore/aft along the body; and a gusset component formed integrally with one of the upper and lower component for securing the header to the roof rail and extending diagonally between the header and the roof rail to reinforce a body corner joint.

2. The assembly of claim 1, wherein the gusset component further includes an interior edge extending diagonally from the header to the roof rail at an angle between thirty and sixty degrees relative to the lateral axis and the longitudinal axis.

3. The assembly of claim 1, wherein the gusset component further includes an interior edge defining an edge axis oriented at substantially forty-five degrees relative to the lateral axis.

4. The assembly of claim 1, wherein the gusset component further includes a gusset flange extending from a gusset component body and defining a first plane parallel with a second plane defined by an upper surface of the roof rail.

5. The assembly of claim 1, wherein the gusset component is located adjacent a ventilation opening defined by a roof assembly.

6. A vehicle body assembly comprising:
   a vehicle body including a vehicle A-pillar;
   a first roof rail extending fore/aft along the vehicle body for securing to the vehicle A-pillar;
   a second roof rail opposite the first roof rail; and
   a header extending laterally along the vehicle body and including a gusset component for securing to the vehicle A-pillar and the first roof rail,
   wherein the gusset component includes an interior edge oriented substantially forty-five degrees relative to an axis defined by the first roof rail, wherein the roof rails and the header define a moon roof opening therebetween, and wherein the gusset component is located adjacent a corner of the moon roof opening.

7. The assembly of claim 6, wherein the gusset component further includes a gusset flange offset from a body of the gusset component and defining a first plane parallel with a second plane defined by an upper surface of the first roof rail.

8. The assembly of claim 6, wherein the gusset component further includes a gusset flange extending from a body of the gusset component at an angle between 40 degrees and 50 degrees.

9. The assembly of claim 6, wherein the header comprises an upper header component secured to a lower header component.

10. The assembly of claim 6, wherein the gusset component is attached to a portion of a roof assembly located adjacent a ventilation opening.

11. A vehicle body corner joint assembly comprising:
    an A-pillar;
    a front header;
    a roof rail; and
    a joint assembly securing the A-pillar, the front header, and the roof rail to one another and including a gusset component having an interior gusset edge extending between the front header and the roof rail at an angle between thirty and sixty degrees to structurally reinforce the joint assembly, wherein the gusset component is located adjacent a corner of an opening for a moon roof defined by the front header and the roof rail.

12. The assembly of claim 11, wherein the interior gusset edge extends between the front header and the roof rail at substantially forty-five degrees.

13. The assembly of claim 11, wherein the gusset component is formed integrally with one of the A-pillar, the roof rail, and the front header.

14. The assembly of claim 11, wherein the gusset component further includes a gusset flange extending from a body of the gusset component and defining a first plane parallel with a second plane defined by an upper surface of the roof rail.

\* \* \* \* \*